Figure 1:
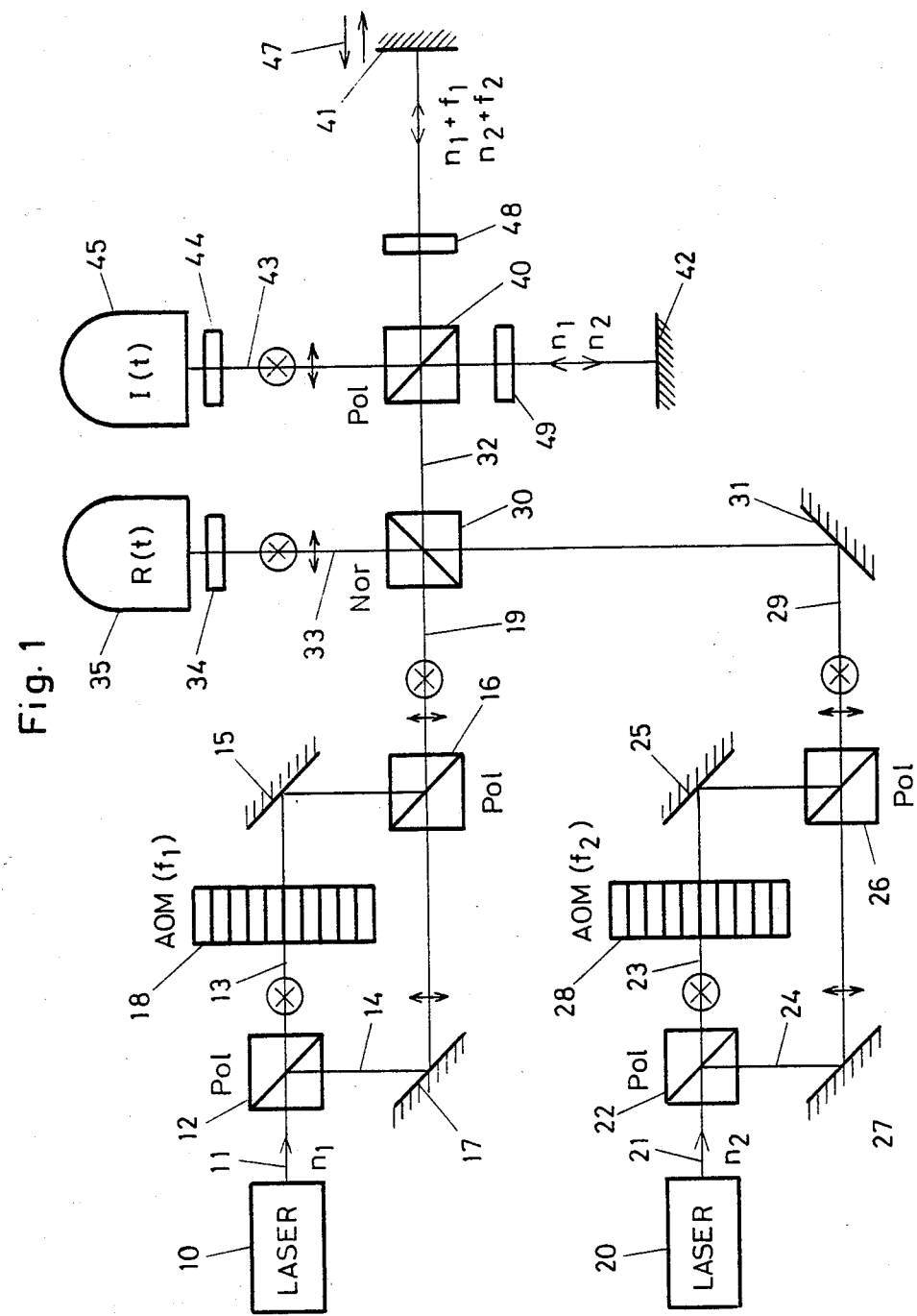

United States Patent [19]

Dandliker

[11] Patent Number: 4,907,886
[45] Date of Patent: Mar. 13, 1990

[54] METHOD AND APPARATUS FOR TWO-WAVELENGTH INTERFEROMETRY WITH OPTICAL HETERODYNE PROCESSES AND USE FOR POSITION OR RANGE FINDING

[75] Inventor: Rene Dandliker, Corcelles, Switzerland

[73] Assignee: Wild Heerburgg, AG, Herrbrugg, Switzerland

[21] Appl. No.: 297,866
[22] PCT Filed: Mar. 30, 1988
[86] PCT No.: PCT/CH88/00070
 § 371 Date: Feb. 6, 1989
 § 102(e) Date: Feb. 6, 1989
[87] PCT Pub. No.: WO88/08519
 PCT Pub. Date: Nov. 3, 1988

[30] Foreign Application Priority Data

Apr. 28, 1987 [CH] Switzerland .................. 1633/87

[51] Int. Cl.⁴ .............................................. G01B 9/02
[52] U.S. Cl. ..................................... 356/349; 356/358
[58] Field of Search ............................... 356/349, 358

[56] References Cited

U.S. PATENT DOCUMENTS 3,458,259 7/1969 Bagley et al. .................. 356/349
4,295,741 10/1981 Palma et al. .................. 356/349
4,688,940 8/1987 Sommargren et al. ......... 356/349

Primary Examiner—Davis L. Willis
Assistant Examiner—Matthew W. Koren
Attorney, Agent, or Firm—Helfgott & Karas

[57] ABSTRACT

An apparatus for measuring changes in a variable interference section of an interferometer comprises a laser source for producing beams of the frequency $n_1$ and the frequency $n_2$, polarizing beam splitters for producing cross-polarized partial beams of frequency $n_1$ or $n_2$, modulators for displacing the frequency of one of the partial beams by frequency $f_1$ or $f_2$, a pair of deflecting mirrors in each case and polarizing beam splitters for combining the partial beam $n_1$, $n_1+f_1$, $n_2$, $n_2+f_2$. The apparatus further includes two photodetectors, upstream of which are arranged a polarizer, a Michelson interferometer, a non-polarizing beam splitter for splitting the partial beams in each case into a measuring light beam or a reference light beam. The reference light beam passes to an associated photodetector. The measuring light beam passes into the Michelson interferometer and then to the associated photodetector. The signals of the photodetectors are demodulated according to the amplitude and the phase difference between the two demodulated signals is determined. This phase difference is only dependent on the position of a measurement object and the equivalent wavelength of the difference $n_1-n_2$. A method for measuring changes by determining positions or distances is performed by the apparatus.

22 Claims, 4 Drawing Sheets

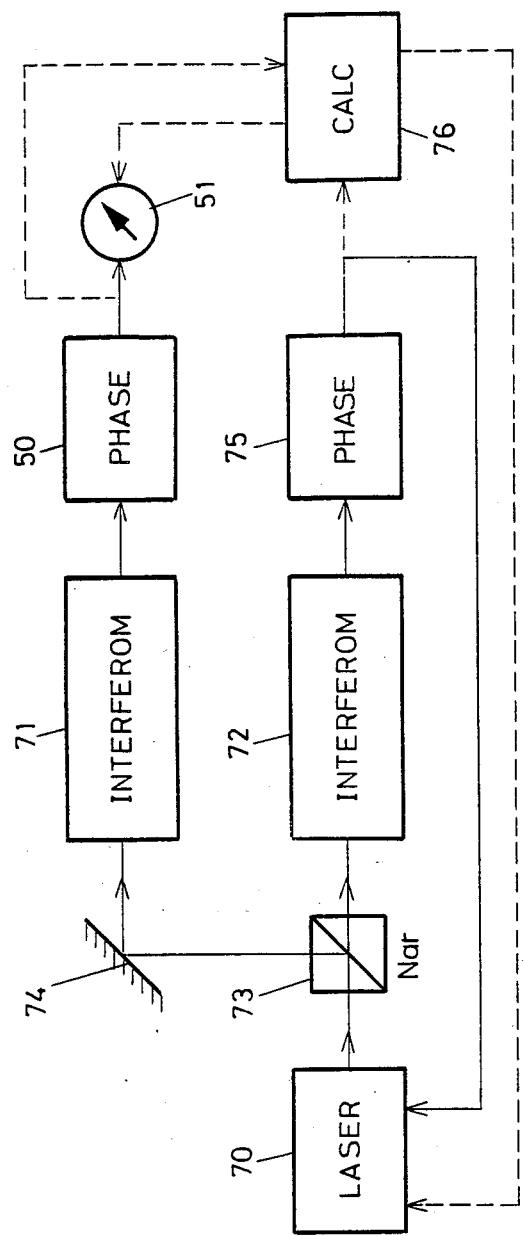

METHOD AND APPARATUS FOR TWO-WAVELENGTH INTERFEROMETRY WITH OPTICAL HETERODYNE PROCESSES AND USE FOR POSITION OR RANGE FINDING

The invention relates to a method for measuring changes to a variable interference section of an interferometer using two-wavelength interferometry and optical heterodyne processes according to the preamble of claim 1, as well as the use of the method and an apparatus for performing the same.

For the optical measurement of distances of more than a few kilometers use is conventionally made of light pulses, for distances between a few kilometers and a few meters measurement generally takes place by phase measurement on sinusoidally modulated light and for distances below a few meters a coherent light-operated interferometer is normally used. The optical measurement of distances with light pulses or sinusoidally modulated light permits a measuring accuracy of approximately 1 mm for a measuring duration of a few seconds. In the case of interferometric measurement, the measuring section during the measuring time of 10 to 100 ms must be precisely stable within a wavelength of the light, i.e. to approximately 0.1 $\mu$m. Under this condition heterodyne interferometry known e.g. from No. EP-0194941 permits the attainment of a measuring accuracy of approximately $10^{-3}$ wavelength, i.e. approximately 1 nm.

For measuring distances up to a few hundred meters with an accuracy and sensitivity of fractions of a millimeter and a measuring duration of 10 to 100 ms, it is not possible to use any of the aforementioned methods. Fundamentally the problem of optical range finding with a reduced precision compared with conventional interferometry can be solved by so-called two-wavelength interferometry where, unlike in the case of conventional interferometry, resolution does not take place by the wavelength of the light, but through the equivalent wavelength corresponding to the difference of the light frequencies of the two wavelengths. In the known constructions, such as the apparatus described e.g. by R. Dandliker in "Optoelektronik in der Technik, Vortrage des 5. Internationalen Kongresses Laser 1981" (Springer-Verlag, 1982, pp. 52–53), the measuring section during the measuring time must, as for conventional interferometry, be stable within a wavelength of the light, which is not ensured in most practical cases.

The problem of the invention is therefore to achieve a measuring precision and sensitivity of fractions of a millimeter with a two-wavelength interferometer, without the measuring section having to be more stable during the measuring time that the desired measuring precision. In addition, the measurement must be rapidly performable, i.e. requires a measuring time of 10 to 100 ms.

This problem is solved by the inventive method characterized by the combination of method steps given in claim 1. A use of this method and an apparatus for performing it, advantageous further developments of the method and its use, as well as advantageous constructions of the apparatus can be gathered from the dependent claims.

In the inventive method use is made of two laser beams of frequencies $n_1$ and $n_2$, which are in turn split into two partial beams of frequencies $n_1$, $n_2$, $n_1+f_1$ and $n_2+f_2$. Beat $f_1-f_2$ is formed and its phase evaluated, in that the difference of the phase of said beat is determined before and after the passage through the Michelson interferometer. Changes to the path length in the Michelson interferometer leads to a change of said phase difference. Unlike in the known methods, in the method according to the invention this change to the phase difference is not directly dependent on the frequencies $n_1$, $n_2$, but is only dependent on their difference $n_1-n_2$. Therefore during the measuring period the measuring section only has to be stable with respect to the equivalent wavelength of the differential frequency $n_1-n_2$ and not with respect to the much smaller wavelengths of the optical frequencies $n_1$ and $n_2$. In addition, both with a pair of laser diodes and with a laser emitting on two frequencies it is easier, or can be achieved with a smaller relative error to keep the difference $n_1-n_2$ constant than the individual frequencies $n_1$, $n_2$.

Admittedly the use of the phase signal for stabilizing the laser frequency is known e.g. from No. WO-85/04009, but the latter describes the use of a He-Ne laser which, utilizing the Zeeman effect, supplies two orthogonally polarized light beams with a limited frequency difference (typically 1 MHz). Such a He-Ne laser can be used as a light source for conventional heterodyne interferometers in place of the arrangement known from No. EP-0194941. However, it is not suitable to supply the two optical frequencies $n_1$ and $n_2$ required in the present invention. The two frequencies produced by the Zeeman effect in fact only differ slightly ($n_1-n_2=1$ MHz) and therefore their equivalent wavelength of $c/(n_1-n_2)=300$ m is too long for use in conjunction with the invention.

Examples of the method, the apparatus and the use thereof are described hereinafter with reference to the drawings, where the same or corresponding parts are given the same reference numerals. In the drawings show:

FIG. 1 A basic circuit diagram of a first embodiment of an optical part of the inventive apparatus.

Figure 2:
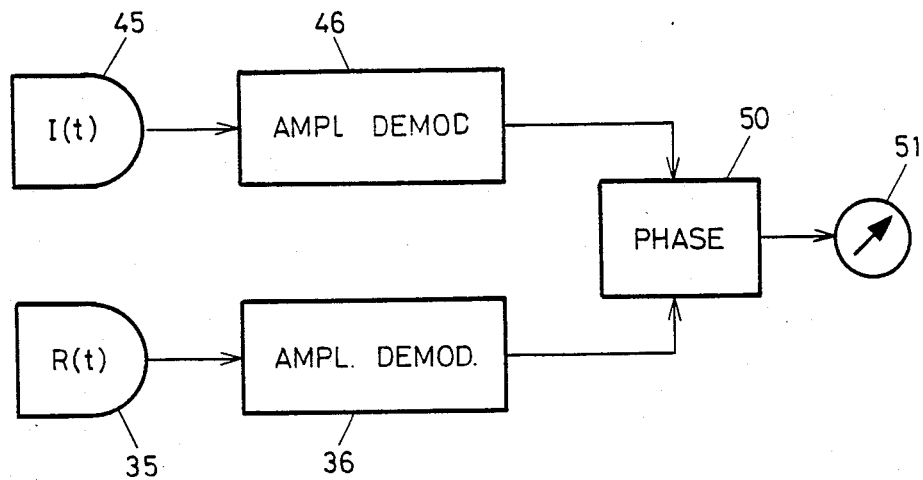

FIG. 2 A block circuit diagram of an electrical part of the inventive apparatus.

Figure 3:
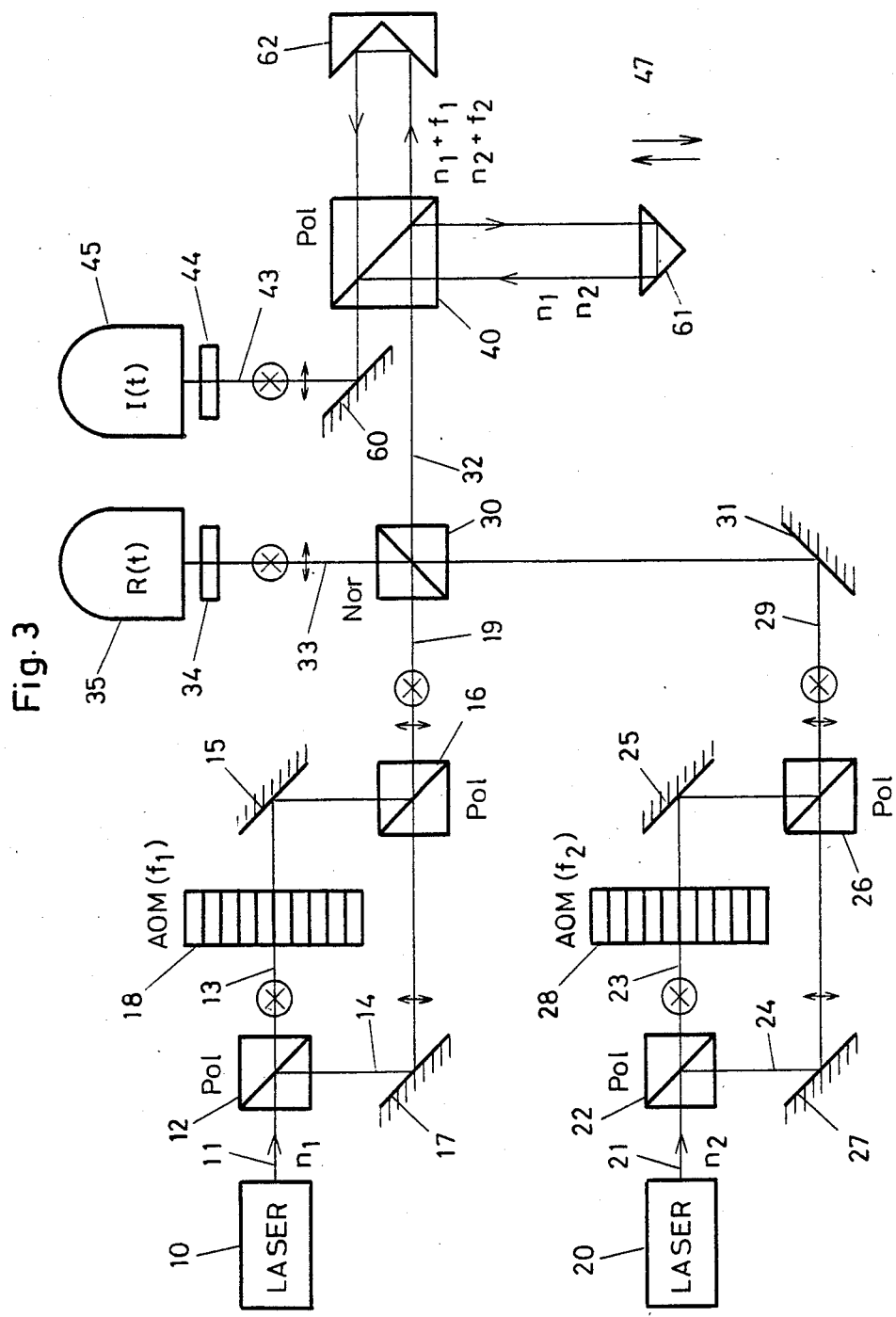

FIG. 3 A basic circuit diagram of a second embodiment of the optical part of the inventive apparatus.

FIG. 4 A block circuit diagram of a third embodiment of the inventive apparatus.

The basic circuit diagram of the inventive apparatus shown in FIG. 1 reveals a laser means, which comprises a laser light source 10 for producing a laser light beam 11 of frequency $n_1$ and a laser light source 20 for producing a laser light beam 21 of frequency $n_2$. The laser light sources 10 and 20, which can be laser diodes, can be two separate laser light sources. However, the laser means can also comprise a single laser light source, which is able to simultaneously produce the two laser beams of frequency $n_1$ and $n_2$, e.g. a He-Ne laser or an Ar laser using different lines or two modi of the same line. In the case of He-Ne lasers, the mode spacing is typically $n_{1-2}=600$ MHz, which corresponds to an equivalent wavelength of $c/(n_1-n_2)=0.5$ m. Stabilized He-Ne lasers supplying two modi with orthogonal polarization making it possible to separate the two frequencies $n_1$ and $n_2$ outside the laser are commercially available. In the case of Ar lasers, the mode spacing is typically $n_1-n_2=6$ GHz, which corresponds to an equivalent wavelength of $c/(n_1-n_2)=50$ mm. Thus, in conjunction with the invention, it is preferable to use two separate Ar lasers with correspondingly matched internal standards. In the case of laser diodes, the frequency can be continuously modified by changing the exciting current in a range of approximately 60 GHz, which corresponds to an equivalent wavelength of $c/(n_1-n_2)=5$ mm and permits the hereinafter described further development of the inventive method, namely the absolute range finding by means of changing the laser frequency and integrating the phase difference.

The laser light beam 11 of frequency $n_1$ strikes an optical element 12 acting as a polarizing half-mirror, which in the represented embodiment is a polarizing beam splitter in the form of a cube prism. Two crossed polarized partial beams 13 and 14, pass at right angles to one another out of the optical element 12 (the polarization directions are represented on the light beam with the conventional symbols). The partial beam 13 strikes a deflecting mirror 15 and the partial beam deflected at right angles strikes an optical element 16 acting as a polarizing half-mirror and which in the represented embodiment is the same as optical element 12. Partial beam 14 strikes a deflecting mirror 17 and the partial beam deflected at right angles also strikes the optical element 16.

On partial beam 13 between the optical element 12 and the deflecting mirror 15 is arranged a modulator 18, which is constructed in the represented embodiment as an acoustooptical modulator. Modulator 18 shifts the frequency $n_1$ of partial beam 15 by frequency $f_1$ to frequency $n_1+f_1$.

Optical element 16 acting as a polarizing half-mirror is selected in such a way that the partial beams 13, 14 striking it pass out of optical element 16 in combined form, but with crossed polarization and therefore pass on as a combined partial beam pair 19 of frequency $n_1$ with one polarizing direction and frequency $n_1+f_1$ with the other polarizing direction.

As can be gathered from FIG. 1, the above described means 10 to 19 is constructed in duplicated form. The second construction is given the reference numerals 20 to 29 and the thus designated elements are identical to the corresponding elements 10 to 19, with the following exceptions. In the second construction, the laser light beam 21 of laser light source 20 has a frequency $n_2$, the modulator 28 shifts the frequency of partial beam 23 by frequency $f_2$ to frequency $n_2+f_2$ and the combined partial beam pair 29 comprises partial beams of frequency $n_2$ with one polarizing direction and partial beams of frequency $n_2+f_2$ with the other polarizing direction.

Both partial beam pair 19 and partial beam pair 29 strike the optical element 30 acting as a non-polarizing half-mirror and which in the represented embodiment is a non-polarizing beam splitter in the form of a cube prism. FIG. 1 shows that the partial beam pair 29 is deflected at right angles by a deflecting mirror 31 between optical elements 26 and 30, but this is not necessary if the two constructions 10 to 19 and 20 to 29 are arranged at 90° of one another.

Optical element 30 splits the partial beams of partial beam pair 19 with frequencies $n_1$ and $n_1+f_1$ into a bundle of measuring light beams 32 and the partial beams of partial beam pair 29 with frequencies $n_2$ and $n_2+f_2$ into a bundle of reference light beams 33. The measuring light beams 32 and the reference light beams 33 pass out of the optical element 30 at right angles to one another.

The reference light beams 33 strike a polarizer 34 and then a photodetector 35. The measuring light beams 32 strike an optical element 40 acting as a polarizing half mirror and which in the represented embodiment is a polarizing beam splitter in the form of a cube prism. This optical element 40 forms the central half-mirror and therefore the optical input and the optical output of a Michelson interferometer. Optical element 40 splits the measuring light beams 32 into two partial beams of approximately identical light intensity and introduces said partial beams into in each case one of the two arms of the Michelson interferometer. In the arm of the Michelson interferometer constituting the measuring arm is arranged a mirror 41 movable in accordance with the arrow pair 47, whilst in the other arm, constituting the reference arm, is arranged a fixed mirror 42. The measuring light beams 43 passing out of the optical output of the Michelson interferometer on optical element 40 strike a polarizer 44 and then a photodetector 45.

In the construction shown in FIG. 1, the spatial separation of the measuring light beams 43 leaving the Michelson interferometer and the measuring light beams 32 entering the Michelson interferometer takes place in that a quarter-wave plate 48, 49 is arranged in each arm of the Michelson interferometer. The double passage of the partial beams through the particular quarter-wave plate 48, 49 in each arm of the Michelson interferometer leads to a rotation of the polarization, which brings about the desired deflections (shown in FIG. 1) of the particular light beams on the polarizing optical element 40.

Polarizers 34 and 44 fulfill the function of bringing about interference between the two differently polarized fractions of the reference light beams 33 and the measuring light beams 43. In the represented embodiment, polarizers 34 and 44 are linear polarizers, which are arranged under 45° with respect to the two polarizations of the reference light beams 33 or the measuring light beams 43.

Photodetector 35 converts the reference light beams 33 interfering after polarizer 34 into an electric signal R(t) and photodetector 45 converts the measuring light beams 43 interfering after polarizer 44 into an electric signal I(t). These two signals I(t) and R(t) are, as shown in FIG. 2, supplied to in each case a demodulator 36 or 46 associated with the photodetector 35 or 45 and demodulated therein in accordance with the square of the amplitude. In a per se known variant, demodulators 36 or 46 can mix, i.e. multiply the particular signal I(t) or R(t) with itself, which is the same as squaring. In another per se known variant, the demodulators 36 and 46 as so-called quadratic detectors can rectify and smooth the particular signal I(t) or R(t).

The two demodulated signals from demodulators 36, 46 are supplied to a device 50 for measuring the phase difference between the two demodulated signals. The phase difference can be displayed on a display 51, but can also be used for other purposes, which will be described hereinafter.

The basic circuit diagram of a second embodiment of the optical part of the inventive apparatus shown in FIG. 3 differs as regards the following features from the already described first embodiment. In place of mirrors 41, 42, FIG. 3 shows that it is also possible to use reflecting prisms or triple prisms, as at 61, as well as triple corner reflectors, mirrors or correspondingly constructed means provided with reflecting faces, as at 62.

If, as shown in FIG. 3, in the two arms of the Michelson interferometer the paths of the partial beams prior to reflecting or scattering are separated spatially at the end of the particular arm from the paths of the partial beams after reflecting or scattering, there is no need for polarization rotation by the quarter-wave plate 48, 49, so that the latter are not shown in FIG. 3. In the case of a relatively small spatial separation of the paths of the partial beams the optical element 40 used at the Michelson interferometer input can also be used at the output and it can be appropriate, as shown in FIG. 3, to have the light beams passing out of the Michelson interferometer deflected by a mirror 60. In the case of a greater spatial separation of the path of the partial beams, it is possible in not shown manner to use at the output of the Michelson interferometer a different polarizing optical element than element 40 arranged at the input, but said two optical elements are substantially identical.

As stated, in the case of the embodiments shown in FIGS. 1 to 3, at the end of each Michelson interferometer arm is arranged in each case one reflecting element 41, 42 or 61, 62. In place of the movable element 41 or 61, it would be possible to use in the measuring arm a random retroreflecting element, e.g. a glass ball or a suspension of small glass balls in a plastic or, as an extension to this variant, an optical element back scattering in the light incidence direction, such as a so-called reflecting adhesive tape.

FIG. 4 shows a further development of the inventive apparatus. The complete apparatus described hitherto is present in a double construction 71, 72 and, for clarifying the explanation given hereinafter, the corresponding devices for measuring the phase difference are separately represented and designated 50 and 75. Display 51 is also shown. In one apparatus 71, the Michelson interferometer includes the variable interference section with the mirror 41 (movable in accordance with the arrow pair 47) or its equivalent 61. In the other apparatus 72, the Michelson interferometer only has stable reference sections. These can e.g. be constructed as optical fibres with a constant optical length.

FIG. 4 shows a single laser means 70, which can comprise a single laser light source, which is able to simultaneously produce the two laser beams of frequencies $n_1$ and $n_2$. As has already been described in connection with FIG. 1, it can e.g. be a He-Ne laser or a Ar laser using different lines or two modi of the same line. However, also in FIG. 1, laser means 70 can represent two separate laser light sources, which can inter alia be laser diodes. It is important that the laser means 70 is able to produce a light beam as a combination of partial beams of frequencies $n_1$ and $n_2$.

The laser light of laser means 70 is split into two partial beams by an optical element 73 acting as a non-polarizing half-mirror and which in the represented embodiment is a non-polarizing beam splitter in the form of a cube prism. After suitable deflection of e.g. one of the partial beams by mirror 74, said partial beams are supplied to the particular apparatus 71, 72. Thus, in FIG. 4, these partial beams represent the two light beams 10 and 20 of FIGS. 1 or 3.

Apparatus 72 with the stable reference sections is used for correcting the measured values and/or for stabilizing the laser light source of laser means 70.

For correcting the phase difference measured in apparatus 71, formed on the phase measuring device 50 and shown on display 51 there can be a feedback of the phase difference measured in apparatus 72 and formed in phase measuring device 75 to a computer 76. The correction calculated in computer 76 can either be indicated to an operator by a display or, as indicated by the broken line in FIG. 4 can be fed back to the display 51 for influencing the latter.

For stabilizing the laser light source of laser means 70, the phase difference measured in apparatus 72 and formed on the phase measuring device 75 can be fed back in a control loop to the laser means 70. As stated hereinbefore, the use of a phase signal for stabilizing a laser frequency is e.g. known from No. WO-85/04009, so that there is no need to provide a more detailed description here of the aforementioned control loop. When using laser diodes, the laser frequency is appropriately stabilized by modifying the exciting current.

The method on which the described apparatuses is based can be summarized as follows (the individual steps of the method have already been explained in connection with the description of the appratuses).

In each case one laser light beam of frequency $n_1$ or $n_2$ is split into two cross-polarized partial beams. The frequency of one partial beam is displaced by the frequency $f_1$ or $f_2$, so that in each case one partial beam pair $n_1$, $n_1+f_1$ or $n_2$, $n_2+f_2$ is formed. When using Ar lasers and two modi, approximately $n_1-n_2=6$ GHz applies and when using a $CO_2$ laser with two rotation transitions approximately $n_1-n_2=50$ GHz applies. For example $n_1-n_2=30$ GHz is obtained with laser diodes. When using acoustooptical modulators e.g. $f_1=40.0$ MHz and $f_2=40.1$ MHz are appropriate.

Both partial beam pairs are combined, then jointly passed across a Michelson interferometer and finally across a polarizer to a photodetector. Prior to the photodetector, there is interference between the partial beams leading to beats of frequency $f_1$ or $f_2$, which are detected by the photodetector.

In addition, a fraction of the combined partial beams prior to the entry thereof in the Michelson interferometer is branched to another photodetector. Here again there is interference between the partial beams prior to the photodetector leading to beats of frequency $f_1$ or $f_2$, which are detected by the other photodetector.

The equations describing the signals I(t) and R(t) of the two photodetectors are in the form $$I(t)=a_0+a_1\cos(2\pi f_1 t+\phi_1)+a_2\cos(2\pi f_2 t+\phi_2)$$

$$R(t)=a_0+a_1\cos(2\pi f_1 t)+a_2\cos(2\pi f_2 t)$$

in which $\phi_1$ and $\phi_2$ mean the optical phase shift of the signals on frequencies $n_1$ and $n_2$ on passing through the interferometer. In the case of a path-length difference L and a light velocity c in the interferometer, said phase shift is $$\phi_1=4\pi n_2 L/c$$

$$\phi_2=4\pi n_2 L/c$$

As is clear, these phases are dependent on the particular frequencies $n_1$, $n_2$. Thus, the signals of the two photodetectors are in each case demodulated according to the square of their amplitude. A demodulated signal of frequency $f_1-f_2$ is in each case formed. The equations describing these signals are of form $$I^2(t)=a_0^2+\ldots+a_1a_2\cos[2\pi(f_1-f_2)t+(\phi_1-\phi_2)]$$

$$R^2(t)=a_0^2+\ldots+a_1a_2\cos[2\pi(f_1-f_2)t].$$

Thus, the phase difference $\phi_1-\phi_2$ can be directly measured on the value of $I^2(t)$ at frequency $f_1-f_2$, in which $R^2(t)$ supplies the phase reference (zero value) and the following is obtained:

$$\phi_1-\phi_2=4\pi(n_1-n_2)L/c.$$

This phase difference varies in linear manner with the changes to the optical path and is only dependent on the frequency difference $n_1-n_2$, but not directly on the particular frequencies $n_1$, $n_2$. Thus, it is only necessary to stabilize the difference of frequencies $n_1$, $n_2$ and not said frequencies individually. With the values given in exemplified manner $f_1-f_2=100KHz$ and the phase difference $\phi_1-\phi_2$ can be measured with a resolution of a few thousandths of a radian. it is therefore possible to attain a resolution of a few dozen micrometers in a measuring range up to a few hundred millimeters.

For stabilizing the frequencies $n_1$ and $n_2$ of the laser light or directly the frequency difference $n_1-n_2$, the method can be simultaneously performed in duplicate with a single laser light source. One Michelson interferometer then contains the variable interference section and the other only stable reference sections. The phase difference obtained from the Michelson interferometer with the stable reference sections is fed back in a control loop to the laser light source. In place of the control loop it is possible to use a computer, which directly corrects the measured value or supplies a corrected value to an operator.

The method is usable for determining positions or distances as a spacing of two positions. For removing the inherent uncertainty of range finding about a number of wavelengths of frequency difference $n_1-n_2$, it is possible to cover the distance to be measured, or the frequency of one of the laser light beams can be changed as a function of time, whilst simultaneously forming the time integral of the measured phase difference. This time integral then varies in linear manner with the measured position. A corresponding computer can control both the frequency change and form the time integral, as well as optionally supplying same for display purposes. This computer can e.g. be the computer 76 which, for such purposes (as shown by a broken line in FIG. 4) can be connected to the phase measuring device 50, the laser means 70 (or 10 and 20 in FIGS. 1 and 3) and optionally display 51.

The method makes it possible to perform measurements in fractions of a second and is consequently ideally suited for industrial purposes.

The inventive method, its inventive use and the inventive apparatus are not restricted to the described embodiments, which merely serve to illustrate the invention. The invention in fact extends to all variants and equivalents covered by the claims.

What is claimed is:

1. Method for measuring changes in a variable interference section of an interferometer using two-wave length interferometry and optical heterodyne processes, the method comprising the steps of splitting a first laser light beam of frequency $n_1$ into two cross-polarized first partial beams, subjecting one of said cross-polarized first partial beams to a frequency displacement by a frequency $f_1$ in order to obtain a partial beam of frequency $n_1+f_1$, whilst the frequency $n_1$ of the other of said first partial beams remains unchanged, so that a partial beam pair $n_1$, $n_1+f_1$ is formed, jointly applying the first partial beams of the partial beam pair $n_1$, $n_1+f_1$ across a Michelson interferometer and then across a polarizer to a photodetector, so that the two partial beams interfere with one another upstream of a photodetector and a beat of frequency $f_1$ is formed, which is detected by the photodetector, the improvement comprising the steps of splitting a second laser light beam of frequency $n_2$ into two cross-polarized second partial beams, subjecting one of said second partial beams to a frequency displacement by a frequency $f_2$, in order to obtain a partial beam of frequency $n_2+f_2$, whilst the frequency $n_2$ of the other of said second partial beams remains unchanged, so that a partial beam pair $n_2$, $n_2+f_2$ is formed, combining the first partial beams of the partial beam pair $n_1$, $n_1+f_1$ and the second partial beams of the partial beam pair $n_2$, $n_2+f_2$ and jointly applying the first and second partial beams across said Michelson interferometer and finally across the polarizer to said photodetector, so that also two second partial beams of the partial beam pair $n_2$, $n_2+f_2$ interfere with one another upstream of the photodetector, and wherein in addition to the beat of frequency $f_1$, at least one beat of frequency $f_2$ is formed, which is detected by said photodetector, and providing a second polarizer, a second photodetector and an optical element acting as a non-polarizing half-mirror, and passing four combined partial beams prior to entry thereof into said Michelson interferometer across said optical element acting as a non-polarizing half-mirror, whereby said optical element deflects a fraction of said partial beams across said second polarizer to said second photodetector, so that the four combined partial beams interfere with one another and beats form upstream of said second photodetector, of which at least respective ones of frequencies $f_1$ and frequency $f_2$ are detected by said second photodetector, demodulating signals of the first and second photodetectors, respectively accordingly to a square of an amplitude thereof, so as to obtain in each case a demodulated signal of frequency $f_1-f_2$, and measuring a phase difference between two demodulated signals, said phase difference varying in a linear manner with changes of an optical path.

2. Method according to claim 1, wherein the first laser light beam of frequency $n_1$ and the second laser light beam of frequency $n_2$ are in each case obtained from a separate laser light source.

3. Method according to claim 1, wherein the first laser light beam of frequency $n_1$ and the second laser light beam of frequency $n_2$ are obtained from the same laser light source, which is able to produce at least two laser beams of frequencies of $n_1$ and $n_2$.

4. Method according to claim 1, wherein the first and second light beams are produced by a single light source, and wherein said first and second light beams are simultaneously used in duplicate, and the Michelson interferometer having a first portion covering a variable interference section and a second portion covering only stable reference sections; and further including the step of feeding a measured value of the phase difference measured in the second interferometer back in a control loop to said laser light source for stabilizing the frequencies $n_1$ and $n_2$ of a laser light.

5. Method according to claim 1, wherein the first and second light beams are produced of a single laser light source, and are simultaneously used in duplicate, and the Michelson interferometer having a first portion covering a variable interference section and a second portion covering only stable reference sections; and further including the step of supplying a measured value of the phase difference which is measured in the second portion of the interferometer to a computer for correcting the measured value of the phase difference measured in the first portion of the Michelson interferometer.

6. Method according to claim 4 or 5, wherein in at least one interference section of the second portion of the Michelson interferometer an optical fibre of predetermined, constant optical length is used.

7. Method according to claim 1, wherein in said demodulating step a demodulation of a signal of at least one photodetector takes place according to the square of the amplitude of said signal by mixing the signal with itself.

8. Method according to claim 1, wherein in said demodulating step a demodulation of a signal of at least one photodetector takes place according to the square of the amplitude of said signal by rectification and smoothing thereof.

9. Method according to claim 1, which is used for determining positions or distances as a spacing between two positions.

10. Method according to claim 9, wherein for avoiding an uncertainty of a distance measurement corresponding to a number of half wavelengths of a difference frequency $n_1 - n_2$, a mirror of the Michelson interferometer is moved along a distance to be measured and during said measurement a time integral of the measured phase difference is formed, said time integral varying in a linear manner with a measured position.

11. Method according to claim 10, wherein for avoiding an uncertainty of a distance measurement corresponding to a number of half wavelengths of a difference frequency $n_1 - n_2$, the frequency of at least one of the laser light beams is modified as a function of time and during such modification forms a time integral of the measured phase difference, said time integral varying in a linear manner with a measured position.

12. Apparatus for measuring changes in a variable interference section of an interferometer using two wave length interferometry and optical heterodyne processes, the apparatus comprising a laser means for producing a first laser light beam of frequency $n_1$ and a second laser light beam of frequency $n_2$; a first optical element acting as a polarizing half-mirror associated with the first laser beam of frequency $n_1$; a second optical element acting as a polarizing half-mirror and associated with the second laser light beam of frequency $n_2$ for splitting in each case a respective laser light beam into one pair of cross-polarized partial beams of frequency $n_1$ and $n_2$, respectively; a first modulator arranged on one of the partial beams of the partial beam pair of frequency $n_1$ for displacing the frequency of said partial beam by a frequency $f_1$ accompanied by a formation of a partial beam pair of frequencies $n_1$, $n_1+f_1$; a second modulator arranged on one of the partial beams of the partial beam pair of frequency $n_2$ for displacing a frequency of said partial beam by a frequency $f_2$ and accompanied by a formation of a partial beam pair $n_2$, $n_2+f_2$; a first pair of deflecting mirrors and a third optical element acting as a polarizing half-mirror for combining the partial beams of the partial beam pair $n_1$, $n_1+f_1$; a second pair of deflecting mirrors; a fourth optical element acting as a polarizing half-mirror for combining the partial beams of the partial beam pair $n_1$, $n_2+f_2$; a first photodetector; a second photodetector; a first polarizer and a second polarizer each arranged in front of a respective photodetector; a Michelson interferometer including an optical input and an optical output, an optical element acting as a non-polarizing half-mirror for splitting the partial beams of the partial beam pair $n_1$, $n_1+f_1$ and the partial beams of the partial beam pair $n_2$, $n_2+f_2$, respectively, into a measuring light beam and a reference light beam and for deflecting the reference light beams onto said first photodetector and the measuring light beams onto the optical input of the Michelson interferometer, the second photodetector being so arranged with respect to the Michelson interferometer output, that the measuring light beams passing out of the optical output of the Michelson interferometer are directed at the second photodetector; two demodulating means each associated with a respective photodetector for demodulating a signal of said respective photodetector in accordance with a square of the amplitude of said signal and for producing a corresponding demodulated signal; and measuring means for measuring a phase difference between two demodulated signals.

13. Apparatus according to claim 12, wherein said laser means comprises two separate light sources.

14. Apparatus according to claim 13, wherein said laser light sources are laser diodes.

15. Apparatus according to claim 12, wherein said laser means comprises a single laser light source, which is able to produce at least two laser beams of different frequency.

16. Apparatus according to claim 15, wherein the Michelson interferometer includes a first portion covering a variable interference section and a second portion covering only stable reference sections.

17. Apparatus according to claim 16, wherein at least one interference section of the second portion of the Michelson interferometer is constructed as an optical fibre of constant optical length.

18. Apparatus according to claim 16, wherein said second portion of the interferometer is constructed so that in control loop, there is a feedback of a value of the phase difference measured in said second portion to said laser means for stabilizing the laser light source.

19. Apparatus according to claim 16, wherein the second portion of the interferometer is constructed so that there is a feedback of a value of the phase difference measured in the second portion to a computer for correcting the measured value given on a display of the phase difference measured in the first portion.

20. Apparatus according to claim 12, wherein at least one of the demodulating means is constructed as a device for mixing the signal with itself.

21. Apparatus according to claim 12, wherein at least one of the demodulating means is constructed as a device for rectifying and smoothing the signal.

22. Apparatus according to claim 12, wherein a display and a computer are provided, said computer being connected to said means for measuring the phase difference, the laser means and optionally to said display, said computer being adapted and programmed for modifying the frequency of at least one of the laser light beams as a function of a time for avoiding uncertainty of a distance measurement corresponding to a number of half wavelengths of the difference frequency $n_1 - n_2$ and during such modifying forming a time integral of a measured phase difference, said time integral varying in a linear manner with a measured position and being optionally supplied to said display.

* * * * *